(12) United States Patent
Asada et al.

(10) Patent No.: US 8,573,179 B2
(45) Date of Patent: Nov. 5, 2013

(54) ENGINE IGNITION CONTROL APPARATUS

(75) Inventors: Yukihiro Asada, Wako (JP); Kenichi Machida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 601 days.

(21) Appl. No.: 12/715,613

(22) Filed: Mar. 2, 2010

(65) Prior Publication Data

US 2010/0242908 A1   Sep. 30, 2010

(30) Foreign Application Priority Data

Mar. 25, 2009   (JP) ................................ 2009-074907

(51) Int. Cl.
*F02P 5/15*   (2006.01)
*F02M 3/06*   (2006.01)

(52) U.S. Cl.
USPC ............. 123/339.11; 123/339.23; 123/406.45

(58) Field of Classification Search
USPC ............. 123/406.23, 406.24, 406.52, 339.11, 123/339.23, 406.45; 701/103–105, 111, 701/110
See application file for complete search history.

(56) References Cited

U.S. PATENT DOCUMENTS

| | | | |
|---|---|---|---|
| 4,416,240 A * | 11/1983 | Matsuoka | 123/493 |
| 4,884,540 A * | 12/1989 | Kishimoto et al. | 123/339.11 |
| 5,267,164 A * | 11/1993 | Miyama | 701/111 |
| 5,345,908 A * | 9/1994 | Nishimura et al. | 123/339.14 |
| 5,492,094 A * | 2/1996 | Cullen et al. | 123/339.11 |
| 5,878,711 A * | 3/1999 | Kamura et al. | 123/295 |
| 6,062,189 A * | 5/2000 | Kaneko et al. | 123/295 |
| 8,099,223 B2 * | 1/2012 | Hirooka | 701/102 |
| 2002/0092293 A1 * | 7/2002 | Yasui et al. | 60/278 |
| 2009/0070011 A1 * | 3/2009 | Takamiya et al. | 701/103 |

FOREIGN PATENT DOCUMENTS

| | | |
|---|---|---|
| JP | 08-189448 | 7/1996 |
| JP | 2000-009008 | 1/2000 |
| JP | 2000-009008 | 11/2000 |
| JP | 2002-266688 | 9/2002 |

* cited by examiner

*Primary Examiner* — Willis R. Wolfe, Jr.
*Assistant Examiner* — Johnny Hoang
(74) *Attorney, Agent, or Firm* — Squire Sanders (US) LLP

(57) ABSTRACT

When cranking starts by turning on a starter switch 14, the ignition timing is first corrected to a fixed value on a retard side. When an IACV 6 reaches a fully opened position, the ignition timing is corrected to the retard side once, and thereafter corrected to an advance side. The correction to the advance side is performed in accordance with a difference between the number of idling target steps and the current number of steps, and the amount of advance correction is reduced as the difference is reduced. Upon completion of the initialization of the IACV 6, the ignition timing correction amount is then restored to the initial value by increasing the amount of advance by a predetermined amount in a stepwise manner.

13 Claims, 5 Drawing Sheets

ENGINE IGNITION CONTROL APPARATUS

BACKGROUND

1. Field

Embodiments of the present invention relate to an engine ignition control apparatus. More particularly, the invention relates to an engine ignition control apparatus suitable, for example, for improving the start-up performance of an engine having an idle air control valve (IACV).

2. Description of the Related Art

A conventional engine control apparatus is provided with an IACV on a bypass passage bypassing a throttle valve and adjusts the amount of intake air during idle running by controlling the opening degree of the IACV when the throttle valve is fully closed. In the opening degree control of the IACV, the fully opened position of the IACV is learned at the start-up of the engine, and the amount of air flowing through the IACV is computed based on the fully opened position.

Accordingly, when the engine is started during the control to learn the fully opened position (during full-open initial processing), the amount of intake air becomes large, so that the engine speed increases.

In this respect, Japanese Patent Application Publication No. 2000-9008 proposes an IACV control apparatus that performs ignition retard control in order to suppress the increase in the engine speed, when the IACV is fully opened. More specifically, this IACV control apparatus performs the ignition retard control by selecting an ignition advance value for feedback control to adjust the engine speed to a target rotational speed, instead of selecting a normal ignition advance value for the time when the throttle valve is fully closed.

The conventional IACV control apparatus performs the feedback control of the engine speed, and therefore needs to set the retarded ignition timing by trial and error while checking conditions of the actual vehicle. These conditions might include an increase in the engine speed. Thus, the conventional IACV control apparatus requires a long setting time.

In a case where the feedback control is implemented by PID control, all the constants of the PID are determined experimentally, so that a confirmation test needs to be conducted several times. In addition, in a case where an advance amount for each level of the engine speed is set by table setting, a test for all the lattice points of the levels of engine speed need to be previously conducted in order to set the advance amount for each level of the engine speed.

SUMMARY

Embodiments of the present invention include an engine ignition control apparatus that provides good start-up performance by suppressing an increase in the engine speed while avoiding the drawbacks of the aforementioned prior art.

One embodiment of the present invention includes an engine ignition control apparatus in an engine control unit for engine control including ignition timing control while an idle air control valve (IACV) is controlled to reach a fully-opened position in full-open initial processing. In the engine ignition control apparatus, a period from when an ignition switch is turned on until the opening degree of the IACV reaches a full opening degree includes a period during which a normal ignition timing is maintained, and thereafter a period during which ignition timing correction is performed by switching the normal ignition timing to a fixed ignition timing on a retard side. The apparatus includes an ignition timing correction unit configured to calculate a proportional function for an ignition timing correction value with respect to the opening degree when the opening degree of the IACV reaches the full opening degree. Thereafter, the ignition timing correction unit is configured to calculate the ignition timing correction value by use of the proportional function in accordance with a difference between an idling target opening degree and the current opening degree, and to correct the ignition timing to an advance side until the opening degree of the IACV reaches the idling target opening degree.

In addition, in another embodiment, the period until the opening degree of the IACV reaches the idling target opening degree after reaching the full opening degree includes a period during which the ignition timing correction value is restored to an initial value by changing the ignition timing correction value to the advance side by a predetermined amount in a stepwise manner, subsequently after the period during which the ignition timing is corrected to the advance side in accordance with the difference between the opening degrees.

Moreover, another aspect of the present invention includes determining the normal ignition timing d on the basis of an engine speed, an intake negative pressure value, and an engine coolant temperature.

Furthermore, in another embodiment, the opening degree of the IACV is determined by the number of steps supplied to a stepper motor for driving an IACV body.

Other embodiments of the invention include a method for ignition control. The method includes calculating a proportional function for an ignition timing correction value with respect to when an opening degree of the IACV reaches the full opening degree, and also calculating the ignition timing correction value by use of the proportional function in accordance with a difference between an idling target opening degree and a current opening degree. The method then includes correcting the ignition timing to an advance side until the opening degree of the IACV reaches the idling target opening degree.

Embodiments of the invention also include an engine ignition control apparatus. The apparatus includes a calculating unit configured to calculate a proportional function for an ignition timing correction value with respect to when an opening degree of the IACV reaches the full opening degree. The apparatus may also include a calculating unit configured to calculate the ignition timing correction value by use of the proportional function in accordance with a difference between an idling target opening degree and a current opening degree. The apparatus may further include a correcting unit configured to correct the ignition timing to an advance side until the opening degree of the IACV reaches the idling target opening degree.

According to embodiments of the present invention, it is possible to prevent an over lean condition due to an increase in the engine speed. The occurrence of the over lean condition is prevented by feed forward control in which, in accordance with the difference between the idling target opening degree and the current opening degree, the ignition timing is restored to the advance side gradually from the state where the IACV is fully opened. Furthermore, the prior setting of the ignition timing becomes unnecessary, since the prior setting is conventionally performed while an increase in the engine speed is checked using an actual vehicle. Accordingly, drawbacks associated with the setting is eliminated. Thus, reduction in the number of processes to a large extent is achievable.

In addition, according to certain embodiments, a fluctuation in the engine speed is suppressed. The fluctuation generally occurring during a period from when the opening degree of the IACV changes to a fully opened state for the initialization of the IACV until the opening degree of the IACV changes to the idling target opening degree. Thereby, the engine speed can be smoothly moved to the idling rotation. Furthermore, even in a case where the valve position of the IACV changes over time, the number of steps of the stepper motor also changes in accordance with this change, so that the best ignition timing control can always be performed.

The normal ignition timing determined on the basis of the engine speed, the intake pressure, or other factors, is maintained immediately after the ignition switch is turned on. Thus, the start-up performance improves as compared with the prior art in which the ignition timing is retarded immediately after the ignition switch is turned on.

DETAILED DESCRIPTION

Figure 2:
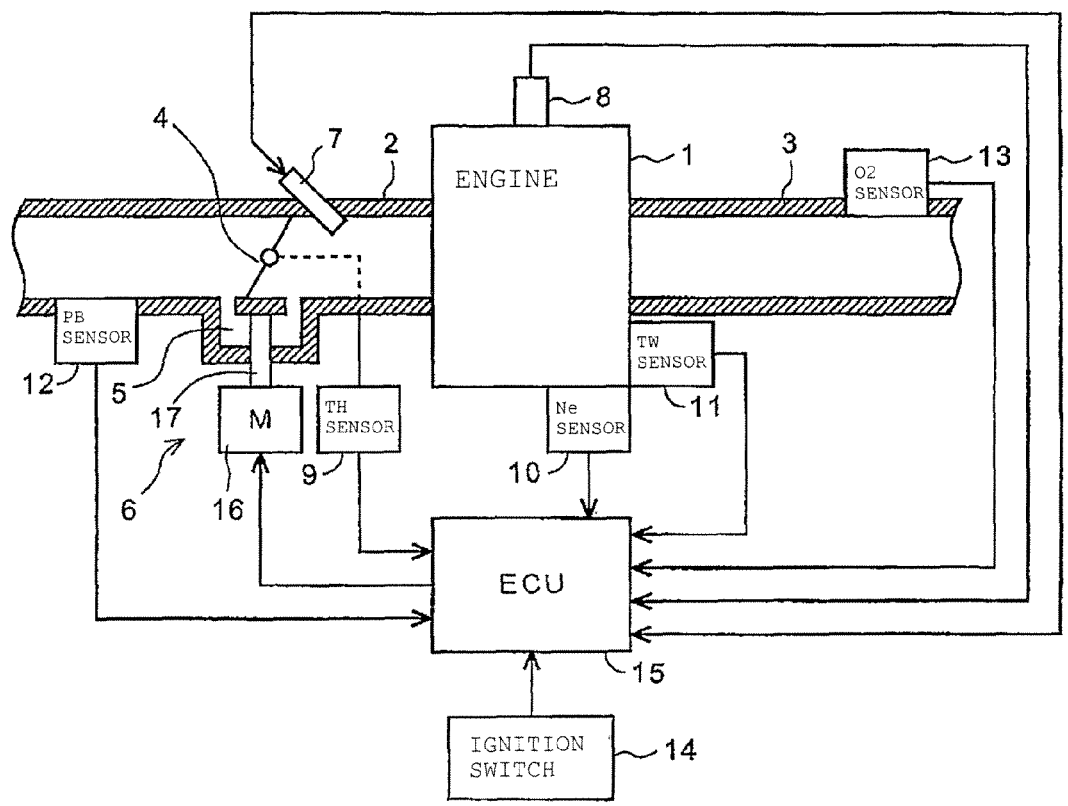
FIG. 2 is a system configuration diagram of an engine on which an example of the ignition control apparatus is installed.

Hereinafter, embodiments of the present invention will be described with reference to the accompanying drawings. FIG. 2 is an engine start-up control apparatus according to an embodiment of the present invention. An engine 1 is a driving source of a motorcycle, for example. The engine 1 is provided with an intake pipe 2 and an exhaust pipe 3. In one embodiment, the intake pipe 2 is provided with a throttle valve 4, a bypass passage 5 and an IACV 6. The bypass passage 5 bypasses the throttle valve 4 and is connected to the intake pipe 2 at both sides of the throttle valve 4. The IACV 6 opens and closes the bypass passage 5. A fuel injection valve 7 is provided on the intake pipe 2 and between the engine 1 and the throttle valve 4. A spark plug 8 is provided in a combustion chamber of the engine 1.

The throttle valve 4 can rotate in accordance with a rotation operation of a throttle grip of the motorcycle. A throttle sensor (TH sensor) 9 detects the amount of rotation (throttle opening degree). The engine 1 is provided with an engine speed sensor (Ne sensor) 10 and a water temperature sensor (TW sensor) 11. The engine speed sensor 10 detects the engine speed on the basis of a rotational speed of an unillustrated crankshaft. The water temperature sensor 11 detects an engine coolant temperature. A PB sensor 12 that detects an intake negative pressure is provided to the intake pipe 2. An O2 sensor 13 that detects an oxygen density in the exhaust is provided to the exhaust pipe 3.

In addition, an ignition switch 14 that causes the spark plug 8 to ignite and thereby to start the engine 1 is provided. The ignition switch 14, in one embodiment, is generally disposed near a handle grip when used for a motorcycle.

According to certain embodiments, detection signals from the throttle sensor 9, the water temperature sensor 11, the PB sensor 12 and the O2 sensor 13, and an engine start signal from the ignition switch 14, are inputted to an engine control unit (ECU) 15 having a microcomputer (CPU). The ECU 15 computes the opening degree of the IACV 6, the ignition timing, and the amount of fuel injection on the basis of the inputted detection signals. The ECU 16 then inputs the computed opening degree of the IACV 6, ignition timing, and amount of fuel injection, to the IACV 6, the spark plug 8 and the fuel injection valve 7, respectively.

The IACV 6 can include a stepper motor 16 and a control valve body 17 that opens and closes the bypass passage 5 by the stepper motor 16. In one embodiment, the opening degree of the control valve body 17 is controlled by the number of steps supplied to the stepper motor 16 from the ECU 15. In this manner, the amount of air flowing in the engine 1 via the bypass passage 5 at the time of an idling operation is determined. Thereby, the idling rotational speed is controlled.

Figure 3:
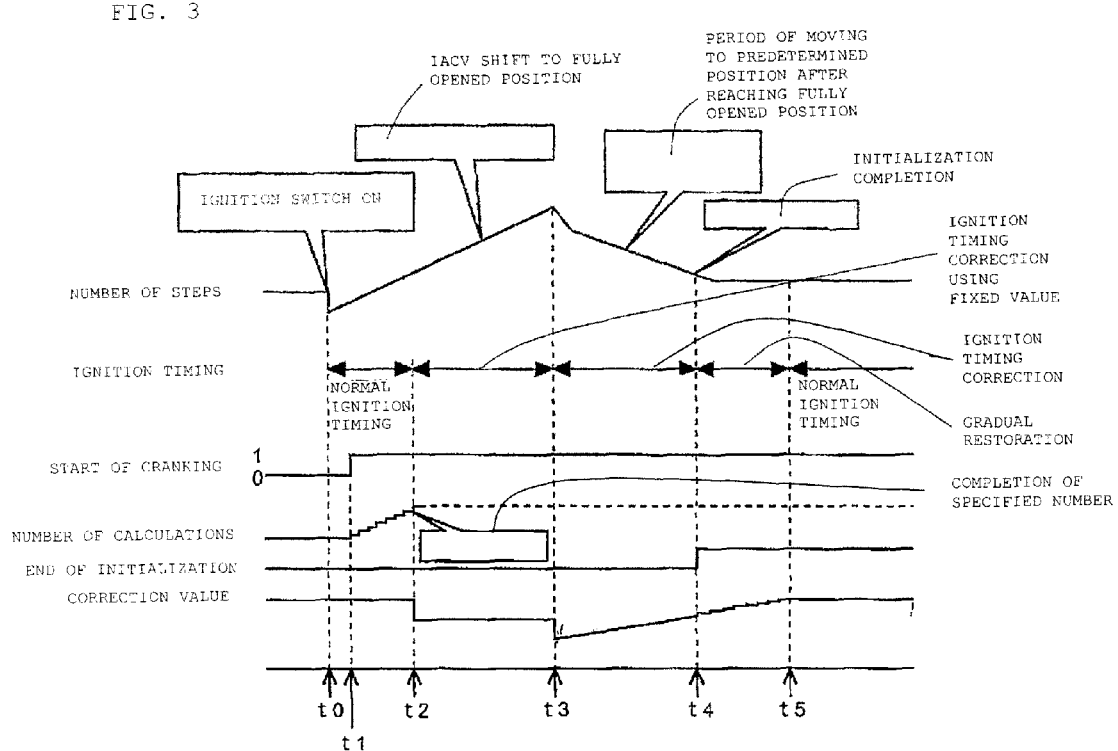
FIG. 3 is an operation timing chart of the ignition control apparatus according to one embodiment.

FIG. 3 is an operation timing chart of the ignition control apparatus according to one embodiment. In the example of FIG. 3, when the ignition switch 14 is turned on at a timing to, power is supplied from an unillustrated battery, and then the IACV 6 is driven in a direction to a fully opened state. At this time, the ignition timing is set to a normal ignition timing that corresponds to a predetermined amount of advance. The normal ignition timing is a value set in a map with the engine speed Ne and an intake negative pressure PB as the parameters. In this embodiment, an ignition timing correction value is added to the opening degree of the normal ignition timing immediately after the start of the engine. Ignition is performed in accordance with the normal ignition timing with the ignition timing correction value is set to the initial value "0" for a predetermined period of time after cranking starts.

At a timing t1, the cranking starts at a predetermined rotational speed. At a timing t2 at which the normal ignition timing is computed a predetermined number of times after the cranking starts, an ignition timing correction value is added to the normal ignition timing. Here, the ignition timing correction value is a fixed value and can be set to any value within a range of −45° to 0°. Specifically, in one embodiment, the ignition timing is corrected to be a value on the retard side from the normal ignition timing. As described, the ignition timing is kept at the normal ignition timing during an unstable period immediately after the start of the cranking. Then, the normal ignition timing is corrected to be a value on the retard side at the timing t2 where it is considered that the engine 1 has rotated a predetermined number of times and thus become stable.

Conventionally, the ignition timing is retarded from the timing to. However, in this embodiment, the ignition timing is set at the normal ignition timing during cranking, so that more favorable start-up performance can be obtained.

When the IACV 6 is fully opened at a timing t3, the ignition timing is moved to the retard side once (up to −45°, for example), and then is restored to the advance side gradually. In one embodiment, the rate at which the ignition timing is restored to the advance side is determined proportionally based on a difference between the opening degree of the IACV 6 in accordance with the idling rotational speed (the number of idling target steps of the motor 16) and the current opening degree of the IACV 6 (the current number of steps of the motor 16). That is, a distance from the current number of steps to the number of target steps.

At the point where the control valve body 17 of the IACV 6 moves from the fully closed state to the fully opened state, a computation for initialization of the IACV 6 is performed. This computation ends at a timing t4, and the initialization of the IACV 6 ends. From this timing, the ignition timing is corrected to be a value on the advance side by a predetermined proportion in a stepwise manner. At a timing t5 where the ignition timing correction value is restored to the initial value, the processing to correct the ignition timing to a value on the advance side ends. Then, the operation is moved to the idling rotation state, and a normal ignition timing computation based on the engine speed Ne and the intake negative pressure PB is started.

Figure 4:
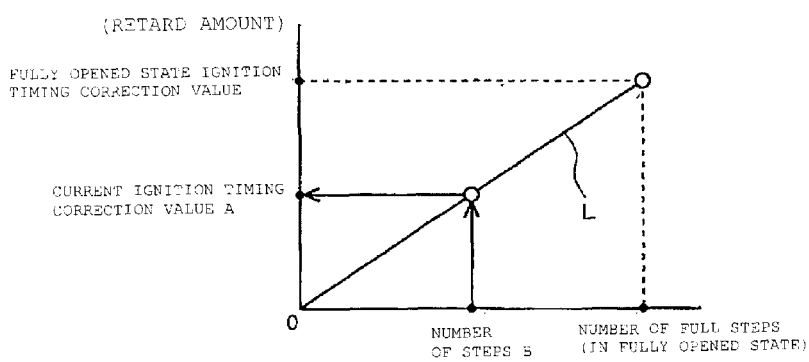
FIG. 4 is a graph showing an example of a proportional function of a difference in the number of steps and an ignition timing correction value.

FIG. 4 is a graph showing a proportional function indicating the relationship between a difference in the number of steps and the amount of ignition retard, according to one embodiment. In the example illustrated in FIG. 4, the horizontal axis indicates the number of steps (the difference in the number of steps from zero) provided to the motor, and the vertical axis indicates the ignition timing correction value. As illustrated, the relationship between the two values are set to show a tendency that the larger the difference in the number of steps, the larger the ignition timing correction value. Accordingly, as the IACV 6 closes toward the number of idling target steps from the fully opened state, the ignition timing is corrected such that the amount of retard gradually becomes small.

As shown by a line L, the relationship between the difference in the number of steps and the amount of ignition retard is such that the amount of ignition retard proportionally changes with respect to the difference in the number of steps. The ignition timing correction value of the fully opened state corresponding to the number of full steps at the time of the fully opened state, which is set at the time of beginning of usage, is previously determined. However, the number of full steps at the time of the fully opened state changes due to a change over time. Accordingly, in one embodiment, the ignition timing correction value of the fully opened state corresponding to the change is calculated by linear interpolation each time the engine is started, and thereby the line L as the proportional function is determined.

When the opening degree of the IACV 6 changes from the fully opened position in a closing direction, the current ignition timing correction value in accordance with the number of steps (difference in the number of steps) until the target opening degree at this point is calculated, in accordance with the function indicated by the line L. For example, a current ignition timing correction value A corresponding to a current number of steps B can be calculated.

Figure 5:
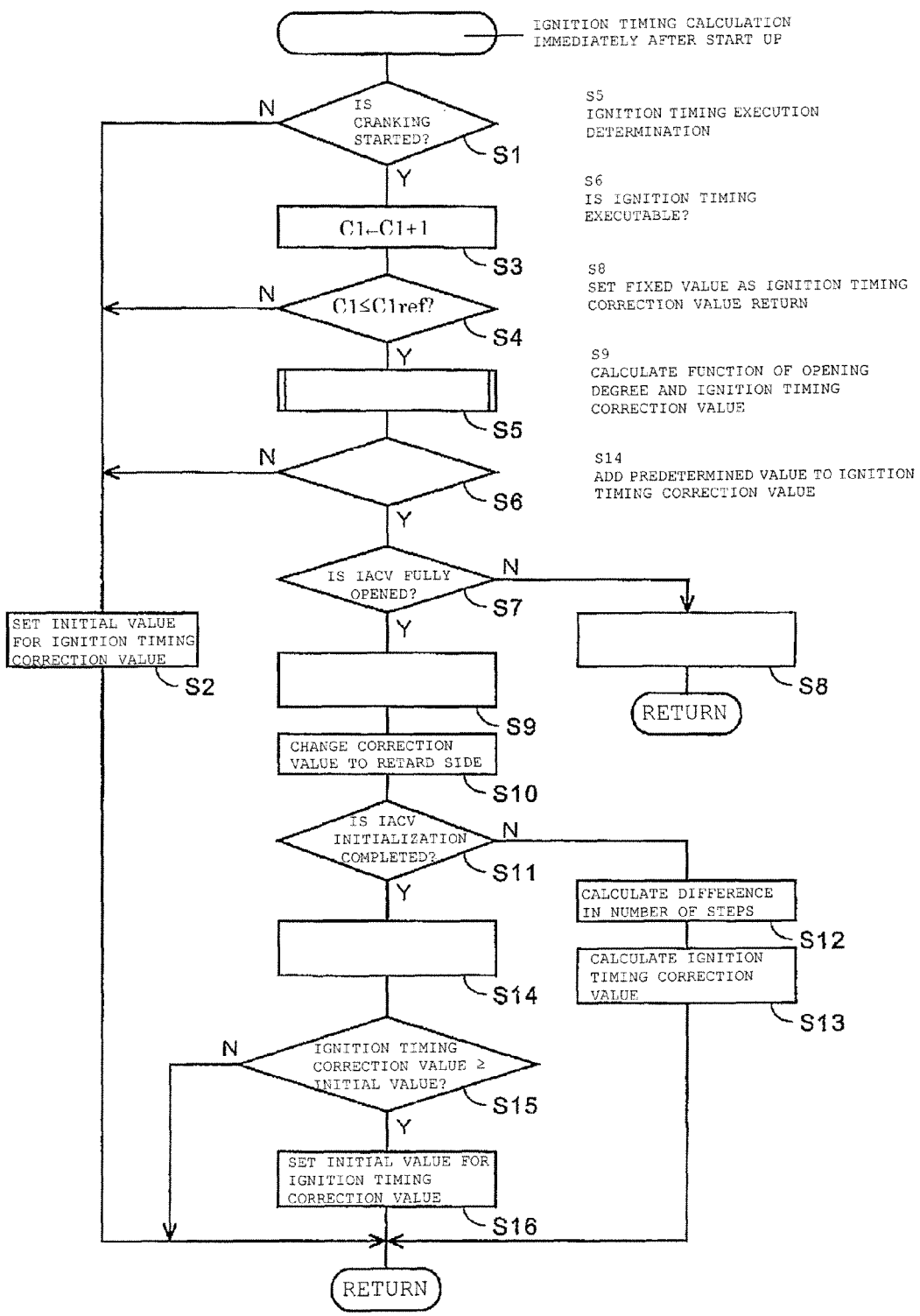
FIG. 5 is a flowchart according to an ignition timing calculation immediately after start-up.

FIG. 5 is an exemplary flowchart of the ignition timing calculation immediately after the engine is started. In step S1, whether cranking has started is determined. This determination can be made by finding out whether or not the engine speed reaches a predetermined cranking rotational speed after the ignition switch 14 is turned on. Until the cranking is started, the process proceeds to step S2 and sets the initial value as the ignition timing correction value immediately after the start of the engine. The initial value is "0" in this example.

When the cranking is started, the process proceeds from step S1 to step S3 and increments a counter value C1 used for counting the number of the ignition timing calculations. In step S4, it is determined whether the counter value C1 is less than a specified number of times C1ref. The process proceeds to step S2 until the number of ignition timing calculations becomes equal to or greater than the specified number of times C1ref. Then, when the number of ignition timing calculations becomes equal to or greater than the specified number of times C1ref, the process proceeds to step S5 and determines whether the ignition timing immediately after the start of the engine is executable (details will be provided below with reference to FIG. 6).

In step S6, when the ignition timing immediately after the start of the engine is not executable as a result of the determination of whether the ignition timing immediately after the start of the engine is executable, the process proceeds to step S2. When the ignition timing immediately after the start of the engine is executable, the process proceeds to step S7. In step S7, it is determined whether the IACV 6 is fully opened, that is, whether the control valve body 17 reaches the limitation of the fully opened side of stroke. Until the IACV 6 is fully opened, the process proceeds from step S7 to step S8, and sets a predetermined fixed value as the ignition timing correction value. This fixed value is a value at least closer to the retard side than the initial value, and, for example, can be set to a value between −45° to 0° as described above.

When the IACV 6 is fully opened, the process proceeds to step S9 where the ignition timing correction value of the fully opened state corresponding to the number of steps at the time of the fully opened state is calculated. Additionally, the straight line L (proportional function), which is the function of the opening degree of the IACV 6, and the ignition timing correction value are calculated.

In step S10, the ignition timing correction value is changed from the current value to the retard side once by a predetermined amount. The maximum of the predetermined amount of retard in one example is −45°. In step S11, it is determined whether initialization of the IACV 6 is completed. Until the initialization of the IACV 6 is completed, the process proceeds to step S12. In step S12, a difference (difference in the number of steps) between the idling target position of the control valve body 17 of the IACV 6 (that is, the number of idling target steps of the motor 16) and the current position of the control valve body 17 of the IACV 6 (that is, the number of steps of the motor 16) is calculated. When the difference in the number of steps is calculated, the process proceeds to step S13, and the ignition timing correction value is calculated by using the function shown by the straight line L in FIG. 4 on the basis of the calculated number of steps.

When the initialization of the IACV 6 is completed, the process proceeds from step S11 to S14, and a predetermined value is added for changing the ignition timing in the advance direction in a stepwise manner. In step S15, it is determined whether the ignition timing correction value is restored to the initial value. When the ignition timing correction value is restored to the initial value, the process proceeds to step S16 where the ignition timing correction value is set to the initial value.

Figure 6:
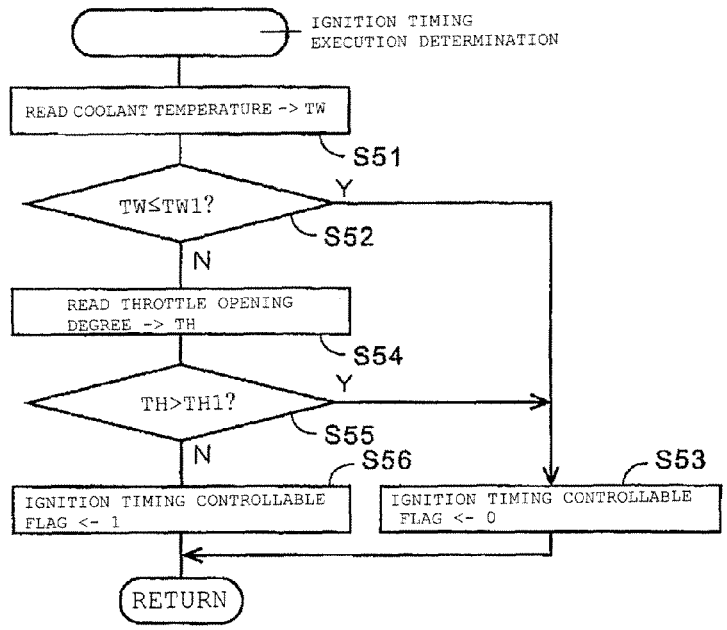
FIG. 6 is a flowchart according to an ignition timing execution setting.

FIG. 6 is an exemplary flowchart of the process to determine whether the ignition timing immediately after the start of the engine is executable. In step S51, a temperature detected by the water temperature sensor 11 is read, and then set to an engine coolant temperature TW. In step S52, it is determined whether the engine coolant temperature TW detected by the water temperature sensor 11 is equal to or less than a determination coolant temperature TW1. When the engine coolant temperature TW is equal to or less than the determination coolant temperature TW1, the process proceeds to step S53, and "0" is set to an ignition timing controllable flag.

When the engine coolant temperature TW is greater than the determination coolant temperature TW1, the process proceeds to step S54 where an opening degree detected by the throttle sensor 9 is read and then set to a throttle opening degree value TH. In step S55, it is determined whether the throttle opening degree value TH detected by the throttle sensor 9 is equal to or greater than a determination opening degree value TH1. When the throttle opening degree value TH detected by the throttle sensor 9 is greater than the determination opening degree value TH1, the process proceeds to step S53. When the throttle opening degree value TH detected by the throttle sensor 9 is less than the determination opening degree value TH1, the process proceeds to step S56, and "1" is set to the ignition timing controllable flag.

As described above, in one embodiment, when the engine coolant temperature is higher than a predetermined value and the throttle opening degree value is smaller than a predetermined opening degree, the ignition timing is determined to be controllable.

Figure 1:
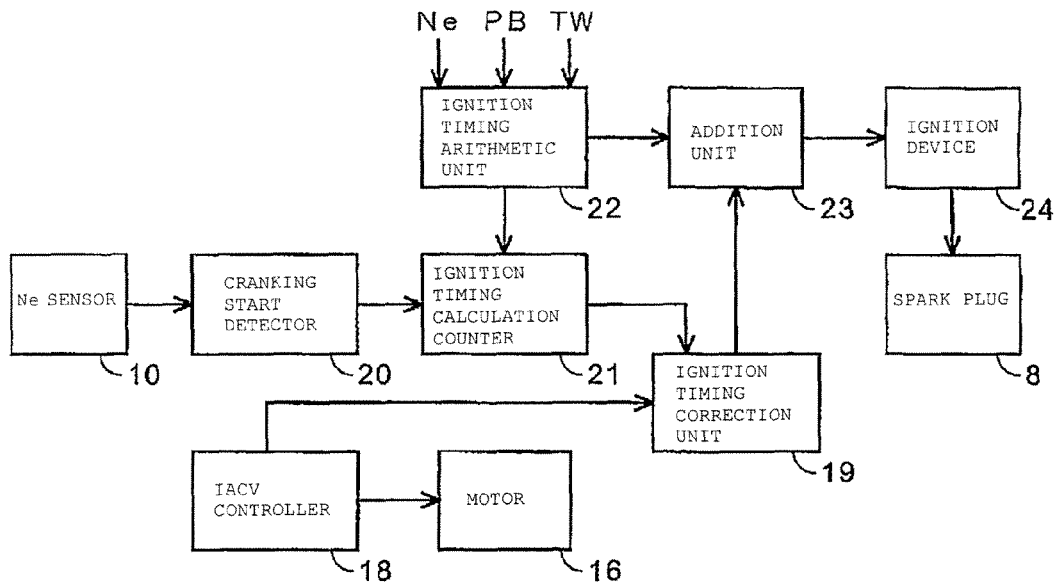
FIG. 1 is a block diagram showing functions of an ignition control apparatus according to an embodiment of the present invention.

FIG. 1 is a block diagram showing certain functions of the ECU 15, according to one embodiment. In the example of FIG. 1, an IACV controller 18 is configured to drive the motor 16 until the control valve body 17 of the IACV 6 reaches the fully opened position. The IACV controller 18 can also be configured to initialize the position of the control valve body 17 of the IACV 6 on the basis of the fully opened position. The IACV controller 18 also may be configured to drive the motor 16 in a direction to close the control valve body 17 until the idling target opening degree (the number of steps supplied to the motor) after the control valve body 17 of the IACV 6 reaches the fully opened position. Further, the IACV controller 18 may determine the IACV opening degree (the number of idling target steps) in accordance with the idling rotational speed, and calculate the difference in the number of steps (the number of idling target steps—the current number of steps). The IACV controller 18 supplies the difference in the number of steps to an ignition timing correction unit 19. The IACV controller 18 can further output a shift completion signal when the moving (shift) of the IACV 6 to the fully opened position is completed, and output an initialization completion signal for the IACV 6.

According to certain embodiments, a cranking start detector 20 detects that the engine speed is a predetermined rotational speed or higher, and then outputs a cranking start detection signal. An ignition timing calculation counter 21 outputs a completion signal indicative of when the ignition timing is calculated a specified number of times from the start of cranking.

An ignition timing arithmetic unit 22 computes an ignition timing (advance value) at the time of normal operation. This can be done by adding a correction amount based on the coolant temperature TW to a map search value based on the engine speed Ne and the intake negative pressure PB.

The ignition timing correction unit 19 outputs, in response to the completion signal of a specified number of times of calculations, a retard correction value that causes the ignition timing to retard by a predetermined amount. In addition, according to some embodiments, the ignition timing correction unit 19 calculates, in response to the shift completion signal, an advance value. The advance value is calculated based on the difference in the number of steps provided from the IACV controller 18 as the ignition timing correction value. The ignition timing correction unit 19 supplies the advance value to an addition unit 23. Moreover, the ignition timing correction unit 19 outputs, in response to the initialization completion signal, an advance correction value increased by a predetermined amount for each predetermined period of time.

In some embodiments, the addition unit 23 adds the ignition timing correction value inputted from the ignition timing correction unit 19 to the ignition timing supplied from the ignition timing arithmetic unit 22. The addition unit 23 supplies the result of the addition to an ignition device 24. The ignition device 24 applies an ignition voltage to the spark plug 8 in accordance with the supplied ignition timing.

Next, a description will be given of a technique to determine the number of idling target steps, according to one embodiment. The relationship of the opening degree of the IACV 6 (the position of the motor 16) and the amount of air flowing through the IACV 6 can be found out in advance as a design value. Moreover, a fluctuation in the engine speed can be suppressed by changing the ignition timing. It is generally known that the engine speed changes by 100 rpm when the amount of retard changes by 1°. Accordingly, the amount of air flowing through the IACV 6 can be calculated from the difference between the number of target steps of the IACV 6 and the number of current steps. Furthermore, the engine speed Ne can be estimated from the amount of air.

For example, suppose that the idling rotational speed is set at 1200 rpm, and the amount of air corresponding to 100 rpm at this time is 0.84 grams/second according to the design value. The number of steps corresponding to this amount of air, 0.84 grams/second, is as follows: 1200 (rpm)/0.84 (grams/second)/100 (rpm/1°)=14.3°/(grams/second).

Meanwhile, the amount of air at the time when the IACV 6 is shifted to a fully opened position and the opening degree (the number of steps) corresponds to the amount of air, are 2.22 grams/second and 240 steps, respectively.

Thus, the difference between the number of idling target steps and the number of steps at the fully opened state is 143 steps and the amount of air is 1.38 grams/second. Accordingly, the table (refer to FIG. 4) of the ignition timing correction value for the difference in the number of steps may be set so that the correction value in the retard direction can be 20° when the number of steps is 143, and the correction value at the time when the difference in the number of steps is "0" is set to "0" (14.3×1.38=20).

Figure 7:
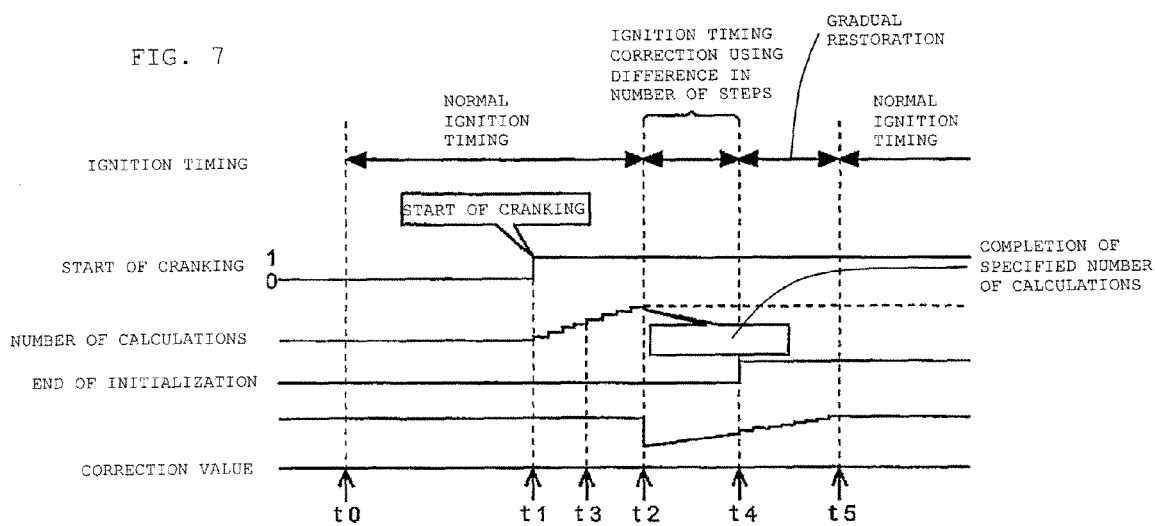
FIG. 7 is an operation timing chart of the ignition control apparatus according to an embodiment.

Note that, although FIG. 3 shows the example in which cranking is started immediately after the control valve body 17 of the IACV 6 is started to be driven toward the fully opened position, the period of time from the start-up operation by the starter switch 14 to the cranking start timing varies. In this respect, a variation of the cranking start timing is shown. FIG. 7 is an example timing chart of a case where the cranking start timing is immediately before the IACV 6 is fully opened. As shown in the timing chart, if the cranking start timing delays, and the specified number of the ignition timing calculations ends after the IACV 6 is fully opened, a retard correction of a normal ignition timing by a fixed value is not performed between the timings t2 and t3 shown in FIG. 4. In this case, upon end of the specified number of the ignition timing calculations, restoration of the ignition timing correction value based on the difference in the number of steps is started immediately after correction toward the retard side is made once at the timing 2. The timing of the completion of the initialization does not change from the timing shown in FIG. 4, so that the change in a stepwise manner between the timings t4 and t5 is performed in the same manner.

Figure 8:
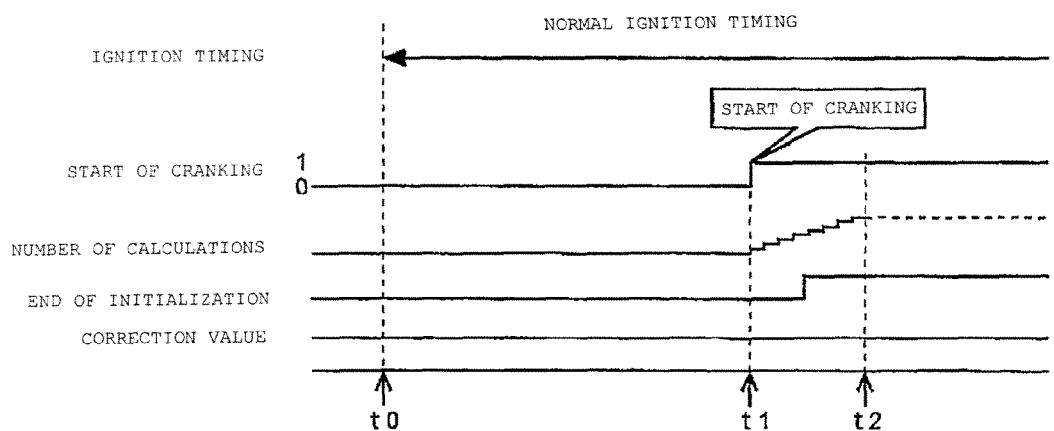
FIG. 8 is an operation timing chart of the ignition control apparatus according to one embodiment.

FIG. 8 is one example of a timing chart of a case where the specified number of ignition timing calculations ends after the completion of the initialization of the IACV 6. When the cranking delays to a large extent as described, the control valve body 17 of the IACV 6 is closed until the number of steps becomes near the idling target value, so that correction of the ignition timing is not necessary and does not need to be performed.

In this embodiment, correction is performed by advancing the ignition timing in accordance with the difference in the number of steps until the completion of initialization after the IACV 6 is fully opened. Moreover, the ignition timing correction value is restored to the advance side by a predetermined amount in a stepwise manner after the completion of the initialization. However, the present invention is not limited to this case. The advance correction operation may be continued by changing the ignition timing correction value to the advance side in accordance with the difference in the number of steps until the ignition timing correction value returns to the initial value "0" even after the completion of the initialization.

DESCRIPTION OF REFERENCE NUMERALS

1 ENGINE
2 INTAKE PIPE
4 THROTTLE VALVE
5 BYPASS PASSAGE
6 IACV
7 FUEL INJECTION VALVE
8 SPARK PLUG
9 THROTTLE SENSOR
10 ENGINE SPEED SENSOR
11 WATER TEMPERATURE SENSOR
12 PB SENSOR
14 STARTER SWITCH
15 ECU
16 STEPPER MOTOR
17 IACV CONTROL VALVE BODY
18 IACV CONTROLLER
19 IGNITION TIMING CORRECTION UNIT
20 CRANKING START DETECTOR
21 IGNITION TIMING CALCULATION COUNTER
22 IGNITION TIMING ARITHMETIC UNIT
23 ADDITION UNIT

We claim:

1. An engine ignition control apparatus, comprising:
an ignition timing correction unit,
the engine ignition control apparatus configured to control an idle air control valve (IACV), provided to a bypass passage bypassing a throttle valve, to reach a fully-opened position in full-open initial processing,
wherein a first period from when an ignition switch is turned on until the opening degree of the IACV reaches a full opening degree includes a period during which a normal ignition timing is maintained, and thereafter a second period during which ignition timing correction is performed by switching the normal ignition timing to a fixed ignition timing on a retard side,
the ignition timing correction unit configured to
calculate a proportional function for an ignition timing correction value with respect to the opening degree when the opening degree of the IACV reaches the full opening degree;
calculate the ignition timing correction value by use of the proportional function in accordance with a difference between an idling target opening degree and the current opening degree; and
correct the ignition timing to an advance side until the opening degree of the IACV reaches the idling target opening degree.

2. The engine ignition control apparatus according to claim 1, wherein the period until the opening degree of the IACV reaches the idling target opening degree after reaching the full opening degree includes: a period during which the ignition timing correction value is restored to an initial value by changing the ignition timing correction value to the advance side by a predetermined amount in a stepwise manner after the period during which the ignition timing is corrected to the advance side in accordance with the difference between the opening degrees.

3. The engine ignition control apparatus according to claim 1, wherein the normal ignition timing is determined on the basis of an engine speed, an intake negative pressure value and an engine coolant temperature.

4. The engine ignition control apparatus according to claim 1, wherein the opening degree of the IACV is determined by the number of steps supplied to a stepper motor configured to drive an IACV body.

5. A method, comprising:
calculating, by an ignition timing correction unit, a proportional function for an ignition timing correction value with respect to when an opening degree of an idle air control valve (IACV) reaches the full opening degree;
calculating, by the ignition timing correction unit, the ignition timing correction value by use of the proportional function in accordance with a difference between an idling target opening degree and a current opening degree; and
correcting, by the ignition timing correction unit, the ignition timing to an advance side until the opening degree of the IACV reaches the idling target opening degree.

6. The method according to claim 5, wherein the period until the opening degree of the IACV reaches the idling target opening degree after reaching the full opening degree includes: a period during which the ignition timing correction value is restored to an initial value by changing the ignition timing correction value to the advance side by a predetermined amount in a stepwise manner after the period during which the ignition timing is corrected to the advance side in accordance with the difference between the opening degrees.

7. The method according to claim 5, further comprising determining the normal ignition timing on the basis of an engine speed, an intake negative pressure value and an engine coolant temperature.

8. The method according to claim 5, further comprising determining the opening degree of the IACV by a number of steps supplied to a stepper motor configured to drive an IACV body.

9. An apparatus, comprising:
an engine controller comprising:
calculating means for calculating a proportional function for an ignition timing correction value with respect to when an opening degree of an idle air control valve (IACV) reaches the full opening degree;
calculating means for calculating the ignition timing correction value by use of the proportional function in accordance with a difference between an idling target opening degree and a current opening degree; and
correcting means for correcting the ignition timing to an advance side until the opening degree of the IACV reaches the idling target opening degree.

10. An engine ignition control apparatus, comprising:
a calculating unit configured to calculate a proportional function for an ignition timing correction value with respect to when an opening degree of an idle air control valve (IACV) reaches the full opening degree;
a calculating unit configured to calculate the ignition timing correction value by use of the proportional function in accordance with a difference between an idling target opening degree and a current opening degree; and a correcting unit configured to correct the ignition timing to an advance side until the opening degree of the IACV reaches the idling target opening degree.

11. The engine ignition control apparatus according to claim 10, wherein the period until the opening degree of the IACV reaches the idling target opening degree after reaching the full opening degree includes: a period during which the ignition timing correction value is restored to an initial value by changing the ignition timing correction value to the advance side by a predetermined amount in a stepwise manner after the period during which the ignition timing is corrected to the advance side in accordance with the difference between the opening degrees.

12. The engine ignition control apparatus according to claim 10, wherein the normal ignition timing is determined on the basis of an engine speed, an intake negative pressure value and an engine coolant temperature.

13. The engine ignition control apparatus according to claim 10, wherein the opening degree of the IACV is determined by the number of steps supplied to a stepper motor configured to drive an IACV body.

* * * * *